US012470300B1

(12) United States Patent
Fan (10) Patent No.: US 12,470,300 B1
(45) Date of Patent: Nov. 11, 2025

(54) RECEIVER COMPENSATION FOR LOW EXTINCTION RATIO AT TRANSMITTER (71) Applicant: Marvell Asia Pte Ltd, Singapore (SG)

(72) Inventor: Shu Hao Fan, Sunnyvale, CA (US)

(73) Assignee: Marvell Asia Pte Ltd, Singapore (SG)

(*) Notice: Subject to any disclaimer, the term of this patent is extended or adjusted under 35 U.S.C. 154(b) by 266 days.

(21) Appl. No.: 18/137,223

(22) Filed: Apr. 20, 2023

Related U.S. Application Data (60) Provisional application No. 63/332,712, filed on Apr. 20, 2022.

(51) Int. Cl.
  *H04B 10/556* (2013.01)
  *H04B 10/2575* (2013.01)

(52) U.S. Cl.
  CPC ... *H04B 10/5561* (2013.01); *H04B 10/25759* (2013.01)

(58) Field of Classification Search
  CPC ............................................. H04B 10/61–6165
  See application file for complete search history.

(56) References Cited

U.S. PATENT DOCUMENTS

| | | | | |
|---|---|---|---|---|
| 2010/0329677 | A1* | 12/2010 | Kaneda | H04J 14/06 398/152 |
| 2012/0148266 | A1* | 6/2012 | Komaki | H04L 25/03019 398/210 |
| 2013/0259487 | A1* | 10/2013 | Sakamoto | H04B 10/6165 398/135 |
| 2018/0069632 | A1* | 3/2018 | Voois | H04B 10/40 |
| 2018/0323871 | A1* | 11/2018 | Fan | H04B 10/5161 |
| 2020/0244366 | A1* | 7/2020 | Fan | H04B 10/6165 |
| 2024/0007193 | A1* | 1/2024 | Arikawa | H04B 10/6161 |

FOREIGN PATENT DOCUMENTS

WO  WO-2007096800 A2 *  8/2007  ............... H04B 1/28

OTHER PUBLICATIONS

Doerr et al., "Single-Chip Silicon Photonics 100-GB/s Coherent Transceiver," OFC 2014, paper Th5C1.1, 2014 (3 pages).
Gill et al., "Implementation tradeoffs for WDM4 PMD in relation to cost," 802.3bm Plenary Meeting, San Antonio, TX, Nov. 20212 (18 pages).
Griffin et al., "InP Coherent Optical Modulator with Integrated Amplification for High Capacity Transmission," OFC 2015, paper Th4E.2, 2015 (3 pages).

(Continued)

*Primary Examiner* — Nathan M Cors (57) ABSTRACT

A digital signal processor (DSP) of an optical receiver processes one or more digital domain signals, which correspond to a received optical signal, to recover receive data from the one or more digital domain signals. The DSP compensates for a two-dimensional (2-D) warping of transmission symbols at a transmitter of the optical signal at least by: calculating a first adjustment of an in phase (I) component of the transmission symbol; modifying the I component of the transmission symbol using the first adjustment; calculating a second adjustment of a quadrature (Q) component of the transmission symbol; and modifying the Q component of the transmission symbol using the second adjustment

18 Claims, 5 Drawing Sheets

(56) References Cited

OTHER PUBLICATIONS

Kim et al., "Mitigation and Monitoring of the Impact of Extinction Ratio of IQ-Modulator on Nyquist M-QAM Signals," IEEE Photonics Tech. Letters, vol. 26, No. 2, pp. 177-179, Jan. 15, 2014.

Kodama et al., "Pre-distortion Technique for Compensating QAM Signal Distortions Generated by Dual-parallel Mach-Zehnder Modulators with Low-extinction Ratio and Small-chirp Parameter," 22nd Microoptics Conf. (MOC2017), Tokyo, Japan, Nov. 19-22, 2017 (2 pages).

Milivojevic et al., "112Gb/s DP-QPSK Transmission Over 2427km SSMF Using Small-Size Silicon Photonic IQ Modulator and Low-Power CMOS Driver," OFC 2013, paper OTh1D.1, 2013 (3 pages).

Napoli et al., "Digital Pre-Distortion Techniques for Finite Extinction Ratio IQ-Mach-Zehnder Modulators," J. Lightwave Tech., vol. 65, No. 1, 2017 (8 pages).

Poirier et al., "InP Integrated Coherent Transmitter for 100 GB/s DP-QPSK Transmission," OFC 2015, paper Th4F.1, 2015 (3 pages).

Rouvalis, "Indium Phosphide based IQ-Modulators for Coherent Pluggable Optical Transceivers," Compound Semiconductor Integrated Circuit Symposium (CSICS), 2015 (4 pages).

Way, "Coherent IQ modulator performance," available at https://www.neophotonics.com/coherent-iq-modulator-performance, Mar. 21, 2016 (4 pages).

Webster et al., "An Efficient MOS-Capacitor based Silicon Modulator and CMOS Drivers for Optical Transmitters," IEEE 11th Int'l Conf. on Group IV Photonics (GFP), 2014 (2 pages).

\* cited by examiner

RECEIVER COMPENSATION FOR LOW EXTINCTION RATIO AT TRANSMITTER

CROSS REFERENCES TO RELATED APPLICATIONS

This application claims the benefit of U.S. Provisional Patent App. No. 63/332,712, entitled "Digital Signal Processing (DSP) Compensation for Mach-Zehnder Modulator (MZM) Low Extinction Ratio in Coherent Transmission," filed on Apr. 20, 2022, the disclosure of which is expressly incorporated herein by reference in its entirety.

FIELD OF TECHNOLOGY

This disclosure relates generally to optical communications, and more particularly to optical receivers.

BACKGROUND

Silicon technology is rapidly evolving, and small-sized, low-power, high-complexity integrated circuits are becoming commercially practical. As a result, coherent optical transmission systems are now commercially viable for Metro networks, campus interconnect systems, and even data center interconnect (DCI) systems. However, implementations of coherent optical transmission systems using conventional lithium niobate (LiNbO$_3$) are not well suited for high-density, low-power short-distance links, such as used in Metro networks, campus interconnect systems, and DCI. On the other hand, silicon photonics (SiPho) is becoming more prevalent and promises ease of fabrication and compact form factors for optical communication systems.

The relatively high refractive index of SiPho makes SiPho-based optical systems more sensitive to impairments that vary based on wavelength and manufacturing processes. Additionally, the high refractive index of SiPho leads to relatively high insertion loss and low extinction ratios (ERs) for SiPho optical transmission systems, which can be problematic. For instance, in conventional Metro or long-haul links where spectral efficiency is relatively less important, low ER is typically not considered a critical problem. On the other hand, DCI tends to have high optical signal-to-noise ratio (OSNR) constraints and requires extremely high data throughput, and as a result low ER is more problematic with DCI. For instance, to achieve the extremely high throughputs often required for DCI, use of higher order modulation techniques, such as quadrature amplitude modulation (QAM) with 16 or more constellation points, is usually necessary. ER becomes an important factor for these high-OSNR, high-order modulation applications, especially with optical transceivers implemented using SiPho technology.

SUMMARY

In an embodiment, an apparatus for processing communication signals received via an optical communication link comprises: an analog-to-digital converter (ADC) configured to convert one or more analog signals corresponding to an optical signal to one or more digital domain signals that include transmission symbols having respective in-phase (I) components and a respective quadrature (Q) components; and a digital signal processor (DSP) coupled to the ADC, the DSP configured to process the one or more digital domain signals to recover receive data from the one or more digital domain signals. The DSP is further configured to compensate for a two-dimensional (2-D) warping of transmission symbols at a transmitter of the optical signal, the compensation comprising, for each of at least some transmission symbols: calculating a first adjustment of an I component of the transmission symbol; modifying the I component of the transmission symbol using the first adjustment; calculating a second adjustment of a Q component of the transmission symbol; and modifying the Q component of the transmission symbol using the second adjustment.

In another embodiment, a method for processing communication signals received via an optical communication link includes: receiving, at a DSP, one or more digital domain signals that correspond to an optical signal and that include a transmission symbol that has experienced a 2-D warping at a transmitter of the optical signal; calculating, at the DSP, a first adjustment of an I component of the transmission symbol; modifying, at the DSP, the I component of the transmission symbol using the first adjustment to compensate for the 2-D warping; calculating, at the DSP, a second adjustment of a Q component of the transmission symbol; and modifying, at the DSP, the Q component of the transmission symbol using the second adjustment to compensate for the 2-D warping.

DETAILED DESCRIPTION

Low extinction ratios (ERs) for silicon photonics (SiPho) often result in SiPho-based coherent optical transmitters introducing a 2-dimensional (2-D) warping in transmission symbols. Typical SiPho-based coherent optical transmitters use Mach-Zehnder modulators (MZMs) implemented using SiPho. An MZM comprises i) two phase-modulation arms, ii) a splitter that directs light to the two phase-modulation arms, and iii) a combiner that combines light from the two phase-modulation arms. Light in the two phase-modulation arms interfere with one another to control the amplitude of the optical electrical field incoming to the MZM. Due to errors in the manufacturing process and/or wavelength-dependency of the refractive indexes of the SiPho materials, however, the splitter is not ideal and does not split the light equally between the two arms, and the combiner is also not ideal and does not combine light from the two arms equally.

As a result, the output of the MZM includes out-of-phase residual energy, which adversely affects constructive interference and/or destructive interference by the MZM. These suboptimal characteristics result in a relatively low ER (as compared to other fabrication materials), where ER is defined as a ratio of a maximum output power to a minimum output power of the MZM.

Figure 1A:
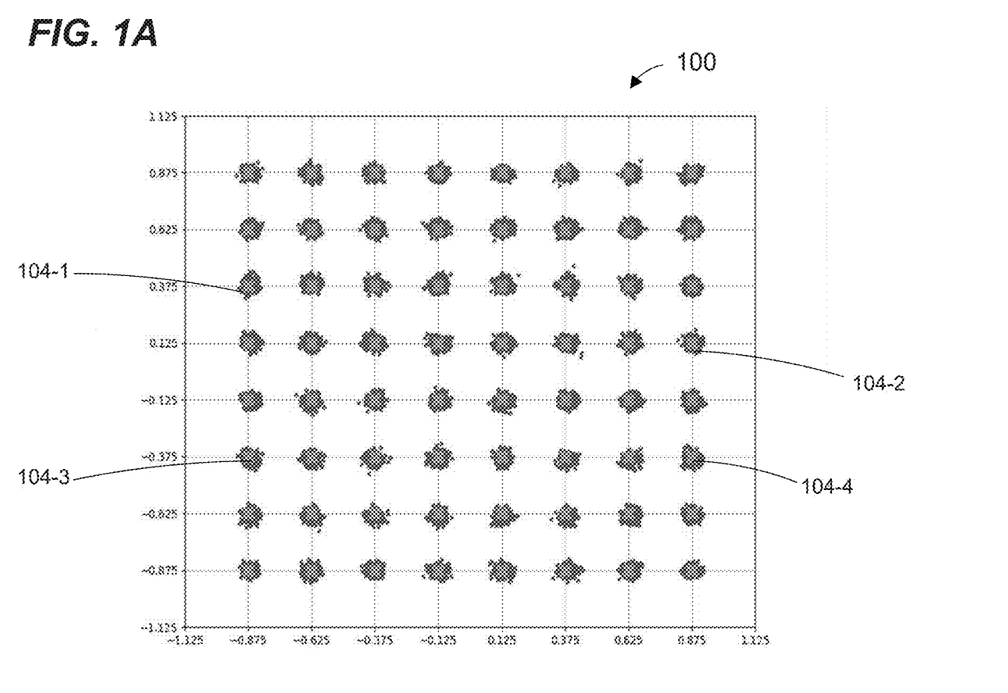
FIGS. 1A-B illustrate simulations of example 2-D warpings in a 64-constellation quadrature amplitude modulation 64-QAM constellation for Mach-Zehnder modulators (MZMs), according to an embodiment.
Figure 1B:
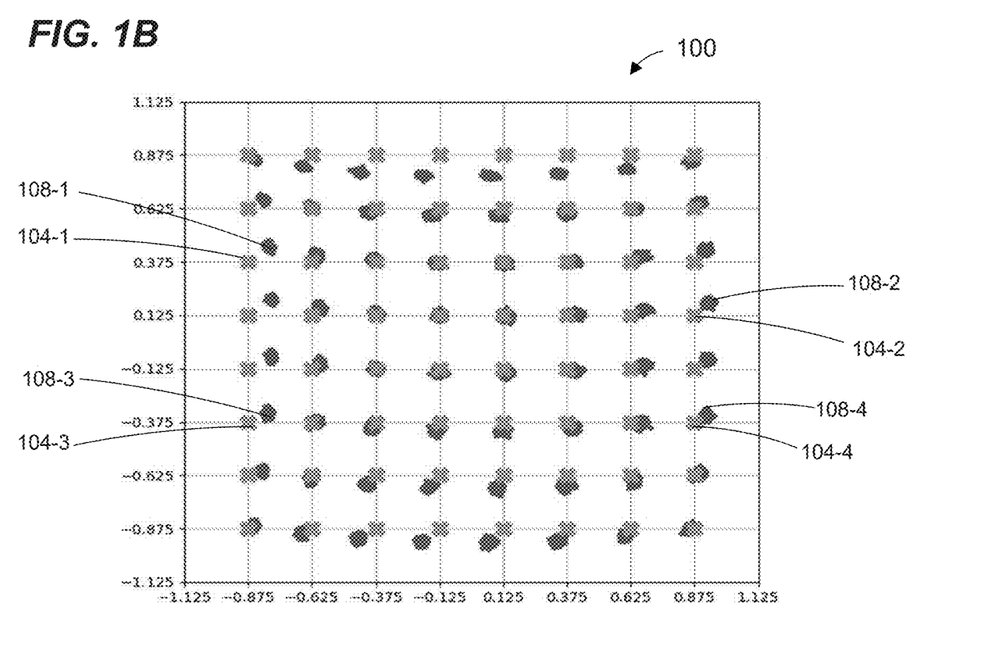

For an in-phase/quadrature (IQ) MZM modulator, this means residual energy from an I signal will leak into a Q signal inducing a dynamic offset that is based on the I signal, and vice versa. Such effects of low ER manifest as a 2-D warping distortion where the offset of the I-signal depends on the Q-signal, and vice versa. For instance, FIGS. 1A-B illustrate a simulation of 2-D warping in a 64-constellation of quadrature amplitude modulation (64-QAM) transmission symbols generated by Mach-Zehnder modulators (MZMs). FIG. 1A illustrates a 64-QAM constellation 100 under high ER conditions. Because ER is relatively high, the sixty four transmission symbols are located at or substantially near ideal locations 104 (indicated by X's in FIGS. 1A-B) because of negligible warping.

On the other hand, FIG. 1B illustrates the 64-QAM constellation 100 under high ER conditions. Because ER is relatively high, locations of some of the transmission symbols, such as transmission symbols 108, are offset from the ideal locations 104.

Previous approaches mitigate such 2-D warping by applying pre-distortion at the transmitter. However, approaches that use pre-distortion at the transmitter are often extremely complex and impractical to commercially implement.

Additionally, previous work predicted that the 2-D warping introduced by the relatively low ER of SiPho-based coherent transmitters would be severe. However, it has been found that, in SiPho-based coherent transmitters that use Mach-Zehnder modulators (MZMs), the 2-D warping is less severe than predicted because previous work did not take into account the effects on the 2-D warping of MZM bias point control. In particular, typical bias point adjustment related to MZM modulators tends to reduce the 2-D warping caused by the low ER of SiPho.

Referring again to FIGS. 1A-B, when ER is relatively low, as illustrated in FIG. 1A, the 2-D warping is minimal. On the other hand, FIG. 1B illustrates that, when ER is relatively high, the 2-D warping is more prominent but still not as severe as had been previously predicted. For example, distortion is relatively minor proximate to the center of the constellation and along the diagonals, whereas distortion is more pronounced at the edges of the constellation (except at the corners).

In embodiments described below, an optical receiver is configured to mitigate a 2-D warping of transmission symbols in a coherently modulated optical signal, the 2-D warping having been introduced at a transmitter of the optical signal. For example, the optical receiver includes a DSP that is configured to mitigate the 2-D warping at least by, for each of at least some transmission symbols, applying a 2-D transfer function. In an embodiment, the 2-D transfer function is a function of a comparison of an amplitude of the I component with an amplitude of a quadrature (Q) component of the transmission symbol. Illustrative examples of the comparison of the amplitude of the I component with the amplitude of the Q component include:

$$\left|\frac{I}{Q}\right|, I^2 - Q^2,$$

etc. In some embodiments, the optical receiver includes a digital signal processor (DSP) that is configured to apply the 2-D transfer function to transmission symbols from the optical signal prior to demapping information bits from the transmission symbols.

Figure 2:
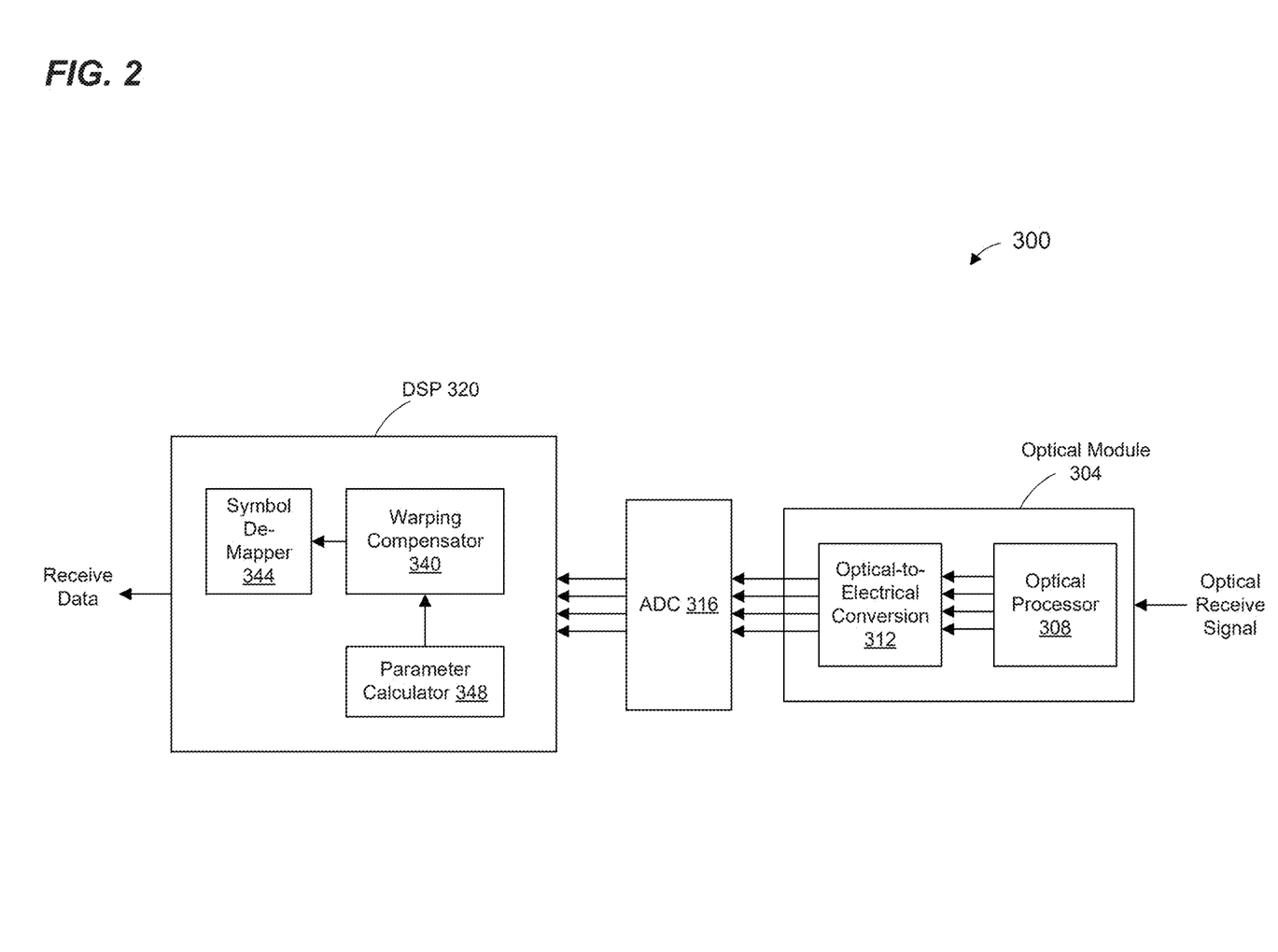
FIG. 2 is a simplified block diagram of an example optical receiver that is configured to mitigate a 2-D warping of transmission symbols in a coherently modulated optical signal, according to an embodiment.

FIG. 2 is a simplified block diagram of an example optical receiver 300 that is configured to mitigate a 2-D warping of transmission symbols in a coherently modulated optical signal that is received by the optical receiver 300, according to an embodiment. The optical receiver 300 includes an optical module 304 that is configured to receive and process an optical signal received via an optical communication medium, such as an optical fiber. The optical module 304 is configured to process the optical signal with an optical processor 308 such as a coherent 90-degree hybrid device, a delay line interferometer (DLI), a Mach-Zehnder interferometer (MZI), etc. The optical module 304 includes optical-to-electrical conversion circuitry 312 that is configured to generate electrical signals based on processed optical signals, such as processed optical signals output by an optical processor such as described above. The optical-to-electrical conversion circuitry 312 includes photodiodes (not shown) that convert light into current signals, as well as transimpedance amplifiers (not shown) that convert the current signals into voltage signals, in some embodiments.

The optical receiver also includes an analog-to-digital converter (ADC) 316 that is configured to convert analog electrical signals output by the optical module 104 to digital domain signals. The ADC 316 is coupled to a DSP 320. The DSP 320 receives digital domain signals from the ADC 316 and recovers information bits from the digital domain signals. For example, the digital domain signals include transmission symbols, and the DSP 320 is configured to demap the transmission symbols to respective sets of information bits.

The DSP 320 includes a warping compensator 340 that is configured to apply a 2-D transfer function to at least some transmission symbols to compensate for 2-D warping of transmission symbols that was introduced at a transmitter of the optical signal. The transmitter is implemented with SiPho, and the 2-D warping of transmission symbols is a result of relatively low ER of the SiPho at the transmitter, according to an embodiment. In an embodiment, the 2-D transfer function applied by the warping compensator 340 is a function of a comparison of an amplitude of the I component with the amplitude of the Q component of the transmission symbol. Illustrative examples of the comparison of the amplitude of the I component with the amplitude of the Q component include:

$$\left|\frac{I}{Q}\right|, I^2 - Q^2,$$

etc.

A symbol demapper 344 is configured to demap transmission symbols to respective sets of information bits. The symbol demapper 344 demaps transmission symbols after the warping compensator 340 applies the 2-D transfer function to at least some of the transmission symbols to mitigate the 2-D warping of transmission symbols that was introduced at the transmitter, in an embodiment.

The 2-D transfer function applied by the warping compensator 340 comprises one or more parameters that are calculated by a parameter calculator 348. Calculation of the one or more parameters of the 2-D transfer function is described further below.

The DSP 320 includes other components, according to various embodiments, that are not illustrated in FIG. 2 for purpose of brevity, such one or more of an equalizer (e.g., a feed-forward equalizer (FFE), a timing recovery unit, etc.

Figure 3A:
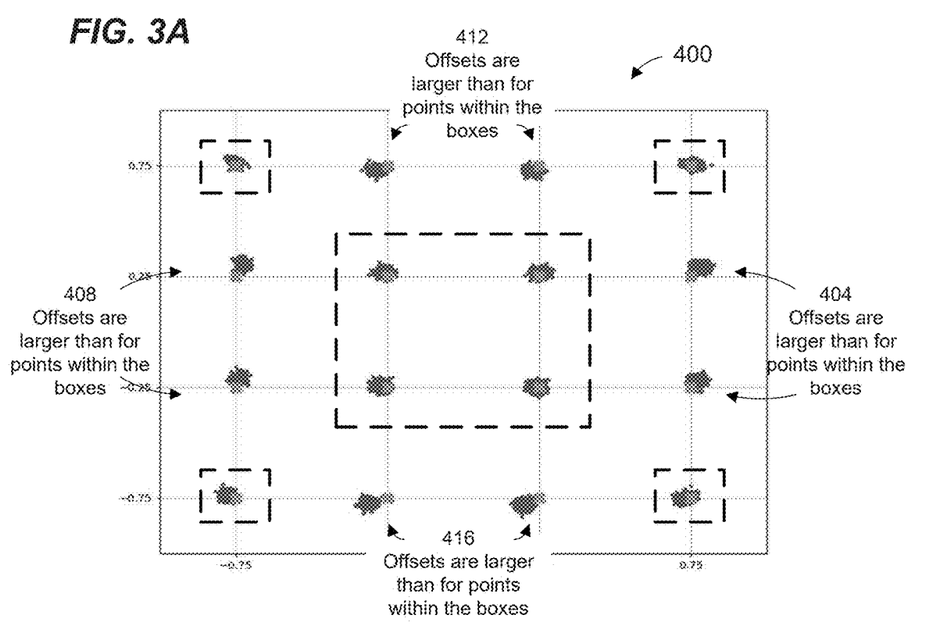
FIG. 3A illustrates a simulation of an example 2-D warping in a 16-QAM constellation for MZM modulators, according to an embodiment.

FIG. 3A illustrates a simulation of an example 2-D warping in a 16-QAM constellation for MZM modulators when a typical, proper bias point adjustment is implemented. Constellation points in which an amplitude of the I component is not significantly larger than an amplitude of the Q component, and vice versa, are enclosed by boxes in FIG. 3A, and offsets caused by the 2-D warping are relatively small for these constellation points. On the other hand, constellation points outside of the boxes correspond to constellation points for which the amplitude of the I component is significantly larger than the amplitude of the Q component, or vice versa. Offsets caused by the 2-D warping are relatively larger for these constellation points. More specifically, in areas 404 and 408 where the amplitude of the I component is larger than the amplitude of the Q component, both I and Q components have positive direct current (DC) offsets. On the other hand, in areas 412 and 416 where the amplitude of the Q component is larger than the amplitude of the I component, both I and Q components have negative DC offsets.

Figure 3B:
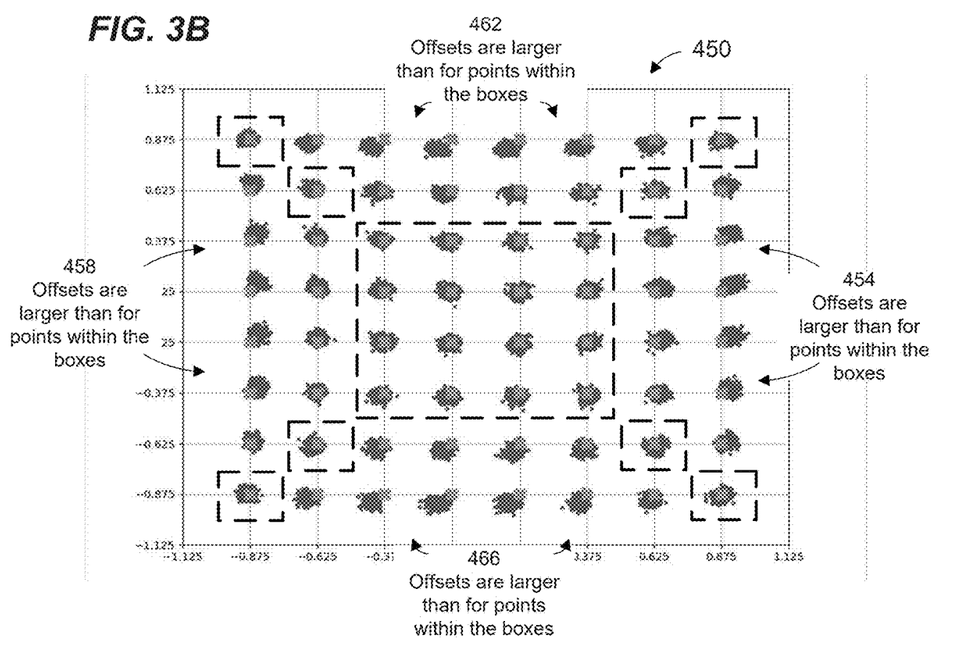
FIG. 3B illustrates a simulation of an example 2-D warping in a 64-QAM constellation for MZM modulators, according to an embodiment.

FIG. 3B illustrates a simulation of an example 2-D warping in a 64-QAM constellation for MZM modulators when a typical, proper bias point adjustment is implemented. Constellation points in which the amplitude of the I component is not significantly larger than the amplitude of the Q component, and vice versa, are enclosed by boxes in FIG. 3B, and offsets caused by the 2-D warping are relatively small for these constellation points. On the other hand, constellation points outside of the boxes correspond to constellation points for which the amplitude of the I component is significantly larger than the amplitude of the Q component, or vice versa. Offsets caused by the 2-D warping are relatively larger for these constellation points. More specifically, in areas 454 and 458 where the amplitude of the I component is larger than the amplitude of the Q component, both I and Q components have positive DC offsets. On the other hand, in areas 462 and 466 where the amplitude of the Q component is larger than the amplitude of the I component, both I and Q components have negative DC offsets.

The 2-D warping caused by relatively low ER at an optical transmitter with MZMs can be modeled as:

$$Ei = \sin(x_i + b_i) - j\alpha_1 \cos(x_i + b_i) \quad \text{Equation 1}$$

$$Eq = \sin(x_q + b_q) - j\alpha_2 \cos(x_q + b_q) \quad \text{Equation 2}$$

where Ei is an I component of a transmit signal, Eq is a Q component of the transmit signal, $x_i$ is an I component prior to warping, $x_q$ is a Q component prior to warping, $b_i$ and $b_q$ are static biases in the I and Q components, respectively, and $\alpha_1$ and $\alpha_2$ are parameters related to the 2-D warping.

When it is assumed that the biases $b_i$ and $b_q$ are non-zero, Ei can be simplified and represented as:

$$Ei = x_i + b_i - \frac{1}{2}x_i^2 b_i - \frac{1}{2}b_i^2 x_i + \alpha_2 - \frac{1}{2}\alpha_2 x_q^2 - \alpha_2 x_q b_q \quad \text{Equation 3}$$

Based on Equation 3, the expected value of Ei at the receiver can be represented as:

$$\mathcal{E}\{\widetilde{Er}\} = b_i - \frac{1}{2}\mathcal{E}\{x_i^2\}b_i + \alpha_2 - \frac{1}{2}\mathcal{E}\{x_q^2\}\alpha_2 \quad \text{Equation 4}$$

If the receiver able to counteract the 2-D warping, $\varepsilon\{\tilde{E}r\}$ becomes zero. Therefore, setting Equation 4 results in:

$$b_i = -\alpha_2 \quad \text{Equation 5}$$

A similar analysis corresponding to Eq (e.g., Equation 2) results in:

$$b_q = +\alpha_1 \quad \text{Equation 6}$$

Assuming $\alpha_1$ and $\alpha_2$ are small, an example 2-D transfer function for counteracting the 2-D warping can be derived from Equation 3, a similar equation for the Q component, Equation 5, and Equation 6:

$$\widetilde{Er} = x_i + \frac{\alpha_2}{2}(x_i^2 - x_q^2) \quad \text{Equation 7}$$

$$\tilde{E}\iota = x_q + \frac{\alpha_1}{2}(x_i^2 - x_q^2) \quad \text{Equation 8}$$

where $x_i$ is an I component of a transmission symbol before compensation, $x_q$ a Q component of the transmission symbol before compensation, $\tilde{E}r$ is the I component after compensation, and $\tilde{E}l$ is the Q component after compensation. The parameters $\alpha_1$ and $\alpha_2$ can be determined by the receiver using techniques such as described below.

The second term of Equation 7 corresponds to a first adjustment that is to be applied (e.g., added) to the I component of a transmission symbol, and the second term of Equation 8 corresponds to a second adjustment that is to be applied (e.g., added) to the Q component of the transmission symbol. The first adjustment and the second adjustment are based on the amplitude of the I component and the amplitude of the Q component. Applying the 2-D transfer function corresponding to Equations 7 and 8 involves: calculating the first adjustment based on the amplitude of the I component and the amplitude of the Q component; modifying the I component of the transmission symbol using the first adjustment; calculating the second adjustment based on the amplitude of the I component and the amplitude of the Q component; and modifying the Q component of the transmission symbol using the second adjustment, according to an embodiment.

The term $x_i^2 - x_g^2$ in Equations 7 and 8 corresponds to a comparison of the amplitude of the I component with the amplitude of the Q component. Thus, calculating the first and second adjustments as described above corresponds to using the comparison of the amplitude of the I component with the amplitude of the Q component.

Other suitable 2-D transfer functions for counteracting the 2-D warping cause by ER characteristics of the transmitter different than Equations 7 and 8 are used in the other embodiments. For example, calculating adjustments to the I and Q components of a transmission symbol involves using another suitable comparison of the amplitude of the I component with the amplitude of the Q component different than comparing a square of the X component with a square of the Q component. For instances, examples of using other suitable comparisons include i) using $$\left|\frac{I}{Q}\right|,$$

ii) using ||I|−|Q||, etc.

Referring again to FIG. 2, the warping compensator 340 is configured to apply a 2-D transfer function, such as described above, to received transmission symbols, according to some embodiments.

The following example metrics have been developed to quantitatively characterize 2-D distortions caused by relatively low ER at the optical transmitter, such as illustrated in FIGS. 3A-B:

$$ER\ Distortion\ Merit(I) = Average(I\ if\ |I\_amp/Q\_amp|>1.5) - Average(I\ if\ |Q\_amp/I\_amp|>1.5) \quad \text{Equation 1}$$

$$ER\ Distortion\ Merit(Q) = Average(Q\ if\ |I\_amp/Q\_amp|>1.5) - Average(Q\ if\ |Q\_amp/I\_amp|>1.5) \quad \text{Equation 2}$$

where I is the I component of a transmission symbol, I_amp is the amplitude of the I component, Q is the Q component of a transmission symbol, and Q_amp is the amplitude of the Q component. Equation 1 corresponds to i) calculating an average of I components of all transmission symbols (in a sample of transmission symbols) that satisfy the constraint |I_amp/Q_amp|>1.5; ii) calculating an average of I components of all transmission symbols (in the sample) that satisfy the constraint |Q_amp/I_amp|>1.5; and subtracting the two averages. Similarly, Equation 2 corresponds to i) calculating an average of Q components of all transmission symbols (in the sample) that satisfy the constraint |I_amp/Q_amp|>1.5; ii) calculating an average of Q components of all transmission symbols (in the sample) that satisfy the constraint |Q_amp/I_amp|>1.5; and subtracting the two averages.

The example metrics described above ignore transmission symbols in which the amplitude of the I component is not significantly greater than the amplitude of the Q component (i.e., |I_amp/Q_amp|≤1.5), and ignore transmission symbols in which the amplitude of the Q component is not significantly greater than the amplitude of the I component (i.e., |Q_amp/I_amp|≤1.5). For instance, it has been observed that the 2-D warping caused by relatively low ER at the optical transmitter is relatively minor for transmission symbols in which the amplitude of the I component is not significantly greater than the amplitude of the Q component, or vice versa.

In some embodiments, the receiver uses metrics such as above to select parameters of the 2-D transfer function that minimize the metrics. For example, the receiver uses metrics such as above to select the parameters $\alpha_1$ and $\alpha_2$ of the 2-D transfer function corresponding to Equations 7 and 8 that minimize the metrics. In some embodiments, the receiver calculates the metrics using transmission symbols received from the optical transmitter, and selects a set of values of the parameters that minimize the metrics as compared to other sets of values of the parameters. In some embodiment, selecting the set of values of the parameters that minimize the metrics comprises an iterative process that involves repeatedly choosing values of the parameters and calculating the metrics with the different chosen values of the parameters. In various embodiments, selecting the set of values of the parameters that minimize the metrics comprises using a suitable optimization algorithm such as a gradient descent algorithm, a random walk process, a Newton's method process, etc. In some embodiments, selecting values of parameters that minimize metrics includes selecting values of parameters that result in the metrics falling below suitable respective thresholds.

In embodiments in which values of metrics that are used increase as the 2-D warping is reduced, the receiver uses the metrics to select parameters of the 2-D transfer function that maximize the metrics. In some embodiments, selecting values of parameters that maximize metrics includes selecting values of parameters that result in the metrics rising above suitable respective thresholds.

Referring again to FIG. 2, the parameter calculator 348 is configured to use metrics to select parameters, such as described above, to be used by the warping compensator when adjusting I and Q components of the transmission symbols.

Figure 4:
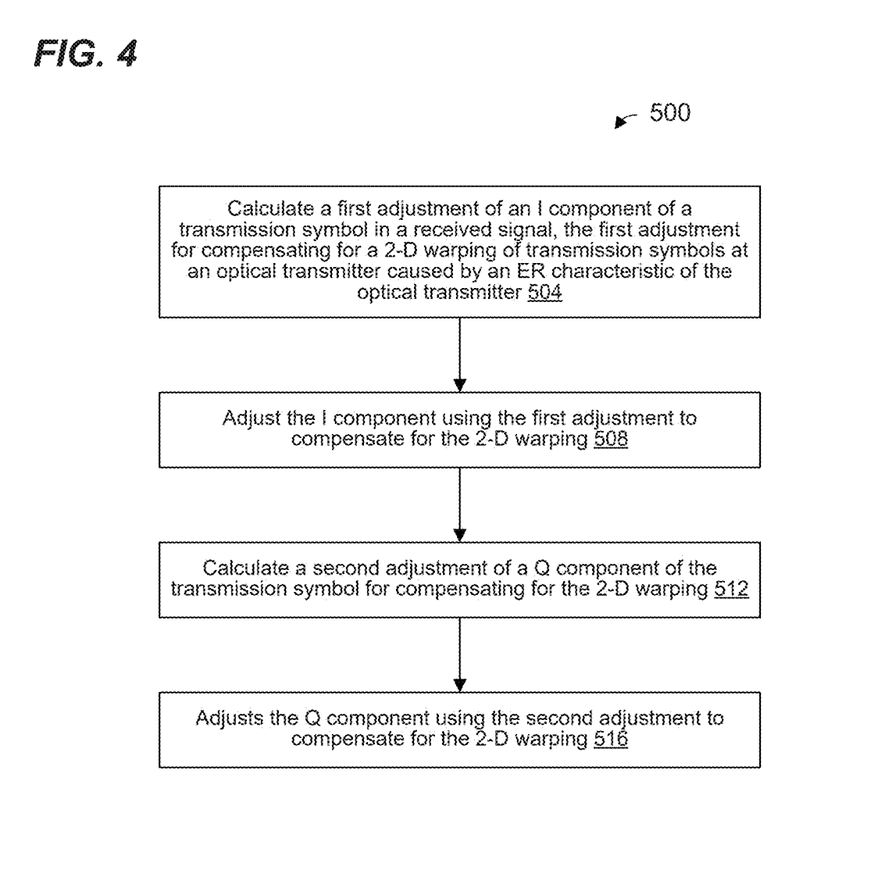
FIG. 4 is a flow diagram of an example method for processing a received signal that corresponds to an optical signal that exhibits 2-D warping caused by an ER characteristic of a transmitter, according to an embodiment.

FIG. 4 is a flow diagram of an example method for processing, at a receiver, a received signal corresponding to an optical signal received via an optical medium, according to an embodiment. The method 500 is implemented by the optical receiver of FIG. 2, in an embodiment. FIG. 4 is described with reference to FIG. 2 for explanatory purposes. In other embodiments, the method 500 is implemented using another suitable optical receiver different than the optical receiver of FIG. 2.

At block 504, the receiver calculates a first adjustment of an in phase (I) component of a transmission symbol in the received signal, the first adjustment for compensating for a 2-D warping of transmission symbols at an optical transmitter caused by an ER characteristic of the optical transmitter. For example, the DSP 320 calculates (e.g., the warping compensator 340 calculates) the first adjustment.

In an embodiment, calculating the first adjustment comprises calculating the first adjustment based on an amplitude of the I component and an amplitude of a Q component. In an embodiment, calculating the first adjustment comprises calculating a comparison of the amplitude of the I component with the amplitude of the Q component, and calculating the first adjustment of the I component using the comparison. In an embodiment, calculating the comparison of the amplitude of the I component with the amplitude of the Q component comprises calculating a difference between a square of the amplitude of the I component and a square of the amplitude of the Q component. In another embodiment, calculating the comparison of the amplitude of the I component with the amplitude of the Q component comprises calculating one of i) a division of the amplitude of the I component by the amplitude of the Q component, and ii) a division of the amplitude of the Q component by the amplitude of the I component.

At block 508, the receiver adjusts the I component using the first adjustment to compensate for the 2-D warping. For example, the DSP 320 adjusts (e.g., the warping compensator 340 adjusts) the I component using the first adjustment.

At block 512, the receiver calculates a second adjustment of a quadrature (Q) component of the transmission symbol for compensating for the 2-D warping. For example, the DSP 320 calculates (e.g., the warping compensator 340 calculates) the second adjustment.

In an embodiment, calculating the second adjustment comprises calculating the second adjustment based on an amplitude of the I component and an amplitude of the Q component. In an embodiment, calculating the second adjustment comprises calculating a comparison of the amplitude of the I component with the amplitude of the Q component, and calculating the second adjustment of the I component using the comparison. In an embodiment, calculating the comparison of the amplitude of the I component with the amplitude of the Q component comprises calculating a difference between a square of the amplitude of the I component and a square of the amplitude of the Q component. In another embodiment, calculating the comparison of the amplitude of the I component with the amplitude of the Q component comprises calculating one of i) a division of the amplitude of the I component by the amplitude of the Q component, and ii) a division of the amplitude of the Q component by the amplitude of the I component.

At block 516, the receiver adjusts the Q component using the second adjustment to compensate for the 2-D warping. For example, the DSP 320 adjusts (e.g., the warping compensator 340 adjusts) the Q component using the second adjustment.

At block 520, the receiver recovers receive data from the transmission symbol after the receiver adjusts the I component and adjusts the Q component. In an embodiment, the DSP 320 recovers (e.g., the symbol de-mapper 344 recovers) the recovers receive data from the transmission symbol after the receiver adjusts the I component and adjusts the Q component.

Figure 5:
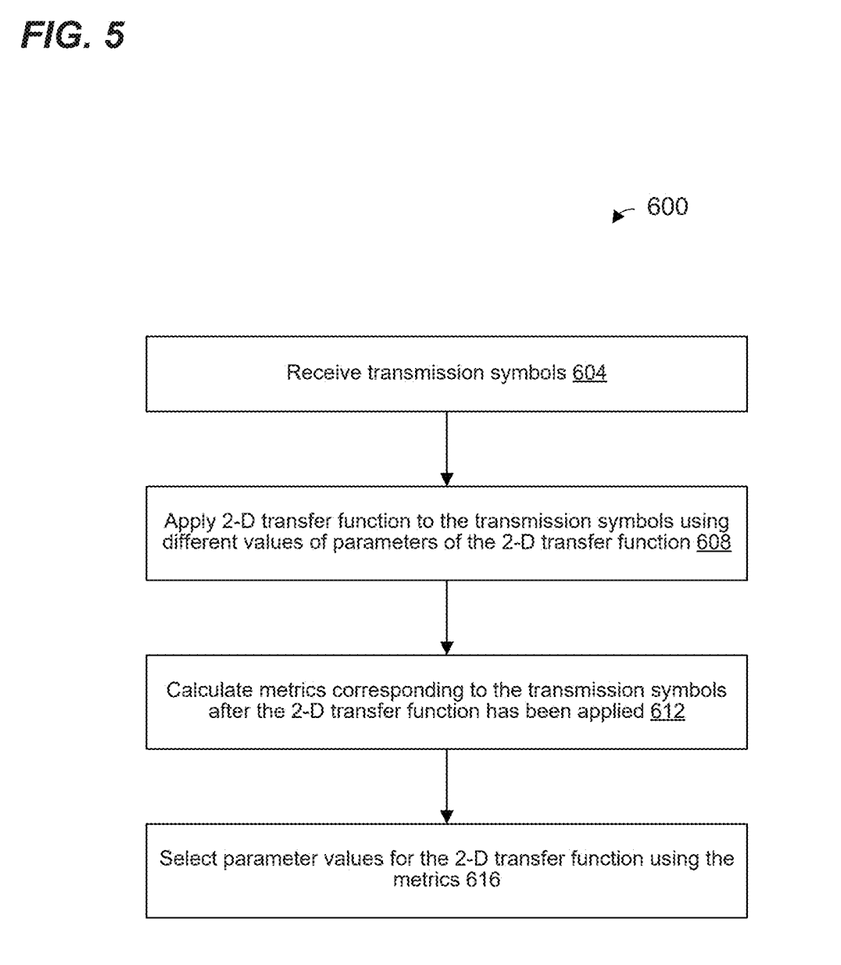
FIG. 5 is a flow diagram of an example method for calculating values of parameters of a 2-D transfer function to be used for compensating for a 2-D warping of transmission symbols caused by an ER characteristic of the optical transmitter, according to an embodiment.

FIG. 5 is a flow diagram of an example method for calculating values of parameters of a 2-D transfer function to be used, at a receiver, to compensate for a 2-D warping of transmission symbols at an optical transmitter caused by an ER characteristic of the optical transmitter, according to an embodiment. The method 600 is implemented by the optical receiver of FIG. 2, in an embodiment. FIG. 5 is described with reference to FIG. 2 for explanatory purposes. In other embodiments, the method 600 is implemented using another suitable optical receiver different than the optical receiver of FIG. 2.

At block 604, the receiver receives transmission symbols that exhibit a 2-D warping introduced at an optical transmitter caused by an ER characteristic of the optical transmitter. For example, the DSP 320 receives the transmission symbols.

At block 608, the receiver applies a 2-D transfer function to the transmission symbols received at block 604. The 2-D transfer function includes parameters, and applying the 2-D transfer function at block 608 includes applying the 2-D transfer function using different values of the parameters. For example, the DSP 320 applies (e.g., the warping compensator 340 applies) the 2-D transfer function to the transmission symbols. In an embodiment, the parameter calculator 348 controls the warping compensator 340 to uses different values of the parameters when applying the 2-D transfer function.

At block 612, the receiver calculates metrics corresponding to the transmission symbols. In an embodiment, the metrics are designed to characterize and/or measure a degree of warping in the transmission symbols. The receiver calculates metrics after the 2-D transfer function has been applied to the transmission symbols, and thus the metrics indicate the degree of warping in the transmission symbols after the 2-D transfer function has been applied. In an embodiment, the DSP calculates (e.g., the parameter calculator 348 calculates) the metrics at block 612.

At block 616, the receiver selects parameter values for the 2-D transfer function using the metrics calculated at block 620. For example, the receiver selects parameter values that minimize the metrics, in some embodiments. However, at least in some embodiments in which values of the metrics increase and as 2-D warping in the transmission symbols decreases, the receiver selects parameter values that maximize the metrics. In an embodiment, the DSP selects (e.g., the parameter calculator 348 selects) the parameter values at block 616.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An apparatus for processing communication signals received via an optical communication link, the apparatus comprising:
    an analog-to-digital converter (ADC) configured to convert one or more analog signals corresponding to an optical signal to one or more digital domain signals that include transmission symbols having respective in-phase (I) components and a respective quadrature (Q) components; and
    a digital signal processor (DSP) coupled to the ADC, the DSP configured to process the one or more digital domain signals to recover receive data from the one or more digital domain signals, the DSP being further configured to compensate for a two-dimensional (2-D) warping of transmission symbols at a transmitter of the optical signal, the compensation comprising, for each of at least some transmission symbols:
        calculating a comparison of an amplitude of an I component of the transmission symbol with an amplitude of a Q component of the transmission symbol,
        calculating a first adjustment of the I component of the transmission symbol using the comparison,
        modifying the I component of the transmission symbol using the first adjustment,
        calculating a second adjustment of the Q component of the transmission symbol using the comparison, and
        modifying the Q component of the transmission symbol using the second adjustment.

2. The apparatus for processing communication signals of claim 1, wherein the DSP is configured to, for each of at least some transmission symbols:
    calculate the comparison of the amplitude of the I component with the amplitude of the Q component at least by calculating a difference between a square of the amplitude of the I component and a square of the amplitude of the Q component;
    calculate the first adjustment of the I component using the difference; and
    calculate the second adjustment of the Q component using the difference.

3. The apparatus for processing communication signals of claim 2, wherein the DSP is configured to, for each of at least some transmission symbols:
    calculate the first adjustment of the I component at least by multiplying the difference by a first parameter, and
    calculate the second adjustment of the Q component at least by multiplying the difference by a second parameter.

4. The apparatus for processing communication signals of claim 1, wherein the DSP is configured to, for each of at least some transmission symbols:
calculate the comparison of the amplitude of the I component with the amplitude of the Q component at least by calculating one of i) a division of the amplitude of the I component by the amplitude of the Q component, and ii) a division of the amplitude of the I component by the amplitude of the Q component.

5. The apparatus for processing communication signals of claim 1, wherein calculating the first adjustment and calculating the second adjustment comprises using a plurality of parameters to calculate first adjustment and the second adjustment, and wherein the DSP is further configured to:
receive a plurality of transmission symbols;
modify the I components and the Q components of the transmission symbols using different values of the plurality of parameters;
calculate metrics corresponding to the transmission symbols, after I and Q components of the transmission symbols were modified using the different values of the plurality of parameters, the metrics designed to measure degrees of 2-D warping in the transmission symbols; and
select values of the plurality of parameters to be used to calculate the first adjustment and the second adjustment.

6. The apparatus for processing communication signals of claim 5, wherein the DSP is configured to select values of the plurality of parameters using one of i) a gradient descent algorithm, ii) a random walk process, and iii) a Newton's method process.

7. The apparatus for processing communication signals of claim 1, where in the DSP is configured to recover a respective set of bits from each transmission symbol after modifying the I component of the transmission symbol and after modifying the Q component of the transmission symbol.

8. The apparatus for processing communication signals of claim 1, further comprising:
an optical module coupled to the DSP, the optical module comprising an optical processor coupled to optical-to-electrical conversion circuitry.

9. The apparatus for processing communication signals of claim 1, wherein the DSP is configured to compensate for a 2-D warping of transmission symbols at the transmitter of the optical signal caused by an extinction ratio (ER) characteristic of the transmitter.

10. A method for processing communication signals received via an optical communication link, the method comprising:
receiving, at a digital signal processor (DSP), one or more digital domain signals that correspond to an optical signal and that include a transmission symbol that has experienced a two-dimensional (2-D) warping at a transmitter of the optical signal;
calculating, at the DSP, a comparison of an amplitude of an I component with an amplitude of a Q component,
calculating, at the DSP, a first adjustment of the I component of the transmission symbol using the comparison;
modifying, at the DSP, the I component of the transmission symbol using the first adjustment to compensate for the 2-D warping;
calculating, at the DSP, a second adjustment of the Q component of the transmission symbol using the comparison; and
modifying, at the DSP, the Q component of the transmission symbol using the second adjustment to compensate for the 2-D warping.

11. The method for processing communication signals of claim 10, wherein:
calculating the comparison of the amplitude of the I component with the amplitude of the Q component comprises calculating a difference between a square of the amplitude of the I component and a square of the amplitude of the Q component;
calculating the first adjustment comprises calculating the first adjustment of the I component using the difference; and
calculating the second adjustment comprises calculating the second adjustment of the Q component using the difference.

12. The method for processing communication signals of claim 11, wherein:
calculating the first adjustment comprises calculating the first adjustment of the I component at least by multiplying the difference by a first parameter, and
calculating the second adjustment comprises calculating the second adjustment of the Q component at least by multiplying the difference by a second parameter.

13. The method for processing communication signals of claim 10, wherein calculating the first adjustment comprises calculating:
calculating the comparison of the amplitude of the I component with the amplitude of the Q component comprises calculating one of i) a division of the amplitude of the I component by the amplitude of the Q component, and ii) a division of the amplitude of the I component by the amplitude of the Q component.

14. The method for processing communication signals of claim 10, wherein calculating the first adjustment and calculating the second adjustment comprises using a plurality of parameters to calculate first adjustment and the second adjustment, and wherein the method further comprises:
receiving, at the DSP, a plurality of transmission symbols;
modifying, at the DSP, the I components and the Q components of the transmission symbols using different values of the plurality of parameters;
calculating, at the DSP, metrics corresponding to the transmission symbols, after I and Q components of the transmission symbols were modified using the different values of the plurality of parameters, the metrics designed to measure degrees of 2-D warping in the transmission symbols; and
selecting, at the DSP, values of the plurality of parameters to be used to calculate the first adjustment and the second adjustment.

15. The method for processing communication signals of claim 14, wherein selecting values of the plurality of parameters comprises using one of i) a gradient descent algorithm, ii) a random walk process, and iii) a Newton's method process.

16. The method for processing communication signals of claim 10, further comprising:
recovering, at the DSP, a set of bits from the transmission symbol after modifying the I component of the transmission symbol and after modifying the Q component of the transmission symbol.

17. The method for processing communication signals of claim 10, further comprising:
processing, by an optical module coupled to the DSP, the optical signal;

generating, by the optical module, one or more electrical signals corresponding to the optical signal; and converting, by an analog-to-digital converter (ADC), the one or more electrical signals to the one or more digital domain signals.

18. The method for processing communication signals of claim 10, wherein:

modifying the I component of the transmission symbol compensates for a 2-D warping of transmission symbols at the transmitter of the optical signal caused by an extinction ratio (ER) characteristic of the transmitter; and modifying the Q component of the transmission symbol compensates for the 2-D warping of transmission symbols at the transmitter of the optical signal caused by the ER characteristic of the transmitter.

* * * * *